(12) United States Patent
Zhang et al.

(10) Patent No.: US 9,185,596 B2
(45) Date of Patent: Nov. 10, 2015

(54) APPARATUS AND METHOD FOR AVOIDING DATA LOSS ASSOCIATED WITH A QOS RESERVATION FAILURE

(71) Applicant: QUALCOMM Incorporated, San Diego, CA (US)

(72) Inventors: Weiye Zhang, Beijing (CN); Haichao Song, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 14/004,276

(22) PCT Filed: Nov. 15, 2012

(86) PCT No.: PCT/CN2012/084656
§ 371 (c)(1),
(2) Date: Sep. 10, 2013

(87) PCT Pub. No.: WO2014/075258
PCT Pub. Date: May 22, 2014

(65) Prior Publication Data
US 2014/0328176 A1    Nov. 6, 2014

(51) Int. Cl.
*H04W 28/02* (2009.01)
*H04W 28/26* (2009.01)
*H04W 28/18* (2009.01)

(52) U.S. Cl.
CPC .......... *H04W 28/0268* (2013.01); *H04W 28/26* (2013.01); *H04W 28/18* (2013.01)

(58) Field of Classification Search
CPC ..... H04W 48/06; H04W 76/04; H04W 40/04; H04W 40/12; H04W 40/34; H04W 88/08; H04W 88/14; H04W 92/04; H04W 92/045; H04W 76/027; H04L 47/12
See application file for complete search history.

(56) References Cited

U.S. PATENT DOCUMENTS 8,180,388 B1 *  5/2012  Ghaus et al. .................. 455/519
2006/0045128 A1  3/2006  Madour
(Continued)

FOREIGN PATENT DOCUMENTS

CN        101222767 A       7/2008

OTHER PUBLICATIONS

Response; Nov. 4, 2012; Merriam Webster; Online.*
(Continued)

*Primary Examiner* — Pao Sinkantarakorn
*Assistant Examiner* — Stephen Steiner
(74) *Attorney, Agent, or Firm* — QUALCOMM IP Department; James Hunt Yancey, Jr.

(57) ABSTRACT

Apparatus and methods are disclosed for avoiding data loss associated with a quality of service (QoS) reservation failure. One such method of wireless communication operable at an access terminal includes receiving a request from an access network for a preselected communication, establishing a radio link with the access network in response to the received communication request, transmitting a Quality of Service (QoS) reservation request message to the access network to request QoS in response to the received communication request, receiving a QoS reservation rejection message from the access network indicating a rejection of the requested QoS, transmitting a RESV request message to the access network in response to the QoS reservation rejection message, and receiving the preselected communication over a preselected flow in response to the RESV request message.

60 Claims, 7 Drawing Sheets

(56) References Cited

U.S. PATENT DOCUMENTS

| | | | |
|---|---|---|---|
| 2006/0092963 A1* | 5/2006 | Bakre et al. | 370/437 |
| 2007/0195788 A1* | 8/2007 | Vasamsetti et al. | 370/395.21 |
| 2009/0103454 A1* | 4/2009 | Watanabe et al. | 370/254 |
| 2011/0021202 A1* | 1/2011 | Rosen et al. | 455/450 |
| 2011/0170411 A1 | 7/2011 | Wang et al. | |
| 2011/0211439 A1* | 9/2011 | Manpuria et al. | 370/216 |
| 2011/0261835 A1 | 10/2011 | Dhesikan et al. | |
| 2011/0292798 A1 | 12/2011 | Manpuria | |
| 2012/0069837 A1 | 3/2012 | Pearce | |
| 2012/0170536 A1 | 7/2012 | Ho | |

OTHER PUBLICATIONS

International Search Report and Written Opinion—PCT/CN2012/084656—ISA/EPO—Jul. 25, 2013.

* cited by examiner

APPARATUS AND METHOD FOR AVOIDING DATA LOSS ASSOCIATED WITH A QOS RESERVATION FAILURE

PRIORITY CLAIM

This application is a 35 USC §371 national phase application of PCT Application No. PCT/CN2012/084656, filed 15 Nov. 2012, which is incorporated herein by reference as if fully set forth below in its entirety and for all applicable purposes.

TECHNICAL FIELD

The following relates generally to wireless communication, and more specifically, to an apparatus and method for avoiding data loss associated with a quality of service (QoS) reservation failure.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power).

In any telecommunications system, the quality of service (QoS) is an important characteristic relating to the quality of a data session, including aspects such as response time, data loss, noise, etc. For some types of communications sessions such as voice calls, a high QoS is needed to enable an acceptable level of satisfaction for users.

In many cellular wireless telecommunication systems, a QoS mechanism may be implemented to actively control parameters and ensure a certain level of QoS, which can be particularly useful when implementing voice over Internet protocol (VoIP) or streaming audio or video services. For example, many networks deployed according to the EVDO standards (managed by an industry group known as 3GPP2) have implemented QoS.

In an EVDO system that implements QoS, a connection between an IP network such as the Internet and the EVDO radio access network (RAN) is moderated by a packet data serving node (PDSN). For certain applications, the PDSN may try to establish a QoS connection with a mobile device. However, the QoS connection may not be possible at a given time and despite this the PDSN may send data with the associated QoS connection. As a result, data loss and/or inefficient allocation of communication resources can occur.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One or more aspects of the disclosure provide for avoiding data loss associated with a quality of service (QoS) reservation failure. For example, one aspect of the disclosure provides a method of wireless communication operable at an access terminal, including receiving a request from an access network for a preselected communication, establishing a radio link with the access network in response to the received communication request, transmitting a quality of service (QoS) reservation request message to the access network to request QoS in response to the received communication request, receiving a QoS reservation rejection message from the access network indicating a rejection of the requested QoS, transmitting a RESV request message to the access network in response to the QoS reservation rejection message, and receiving the preselected communication over a preselected flow in response to the RESV request message.

Another aspect of the disclosure provides an access terminal configured for wireless communication, including means for receiving a request from an access network for a preselected communication, means for establishing a radio link with the access network in response to the received communication request, means for transmitting a quality of service (QoS) reservation request message to the access network to request QoS in response to the received communication request, means for receiving a QoS reservation rejection message from the access network indicating a rejection of the requested QoS, means for transmitting a RESV request message to the access network in response to the QoS reservation rejection message, and means for receiving the preselected communication over a preselected flow in response to the RESV request message.

Another aspect of the disclosure provides an access terminal configured for wireless communication, including a processing circuit, a memory coupled to the processing circuit, and a communications interface coupled to the processing circuit, wherein the processing circuit is configured to receive a request from an access network for a preselected communication, establish a radio link with the access network in response to the received communication request, transmit a quality of service (QoS) reservation request message to the access network to request QoS in response to the received communication request, receive a QoS reservation rejection message from the access network indicating a rejection of the requested QoS, transmit a RESV request message to the access network in response to the QoS reservation rejection message, and receive the preselected communication over a preselected flow in response to the RESV request message.

Another aspect of the disclosure provides a computer program product, including a computer-readable storage medium operative at an access terminal configured for wireless communication, including instructions for causing a computer to receive a request from an access network for a preselected communication, establish a radio link with the access network in response to the received communication request, transmit a quality of service (QoS) reservation request message to the access network to request QoS in response to the received communication request, receive a QoS reservation rejection message from the access network indicating a rejection of the requested QoS, transmit a RESV request message to the access network in response to the QoS reservation rejection message, and receive the preselected communication over a preselected flow in response to the RESV request message.

Another aspect of the disclosure provides a method of wireless communication operable at a packet data serving node (PDSN), including receiving, at the PDSN, a request to establish a preselected communication at an access terminal, communicating with the access terminal regarding the request to establish the preselected communication, receiving a RESV request message indicating an Internet Protocol (IP)

address of the access terminal, and establishing the preselected communication over a preselected flow in response to the RESV request message.

Another aspect of the disclosure provides a packet data serving node (PDSN) configured for wireless communication, including means for receiving, at the PDSN, a request to establish a preselected communication at an access terminal, means for communicating with the access terminal regarding the request to establish the preselected communication, means for receiving a RESV request message indicating an Internet Protocol (IP) address of the access terminal, and means for establishing the preselected communication over a preselected flow in response to the RESV request message.

Another aspect of the disclosure provides a packet data serving node (PDSN) configured for wireless communication, including a processing circuit, a memory coupled to the processing circuit, and a communications interface coupled to the processing circuit, wherein the processing circuit is configured to receive, at the PDSN, a request to establish a preselected communication at an access terminal, communicate with the access terminal regarding the request to establish the preselected communication, receive a RESV request message indicating an Internet Protocol (IP) address of the access terminal, and establish the preselected communication over a preselected flow in response to the RESV request message.

Another aspect of the disclosure provides a computer program product, including a computer-readable storage medium operative at a packet data serving node (PDSN) configured for wireless communication, including instructions for causing a computer to receive, at the PDSN, a request to establish a preselected communication at an access terminal, communicate with the access terminal regarding the request to establish the preselected communication, receive a RESV request message indicating an Internet Protocol (IP) address of the access terminal, and establish the preselected communication over a preselected flow in response to the RESV request message.

These and other aspects of the invention will become more fully understood upon a review of the detailed description, which follows.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems.

Figure 1:
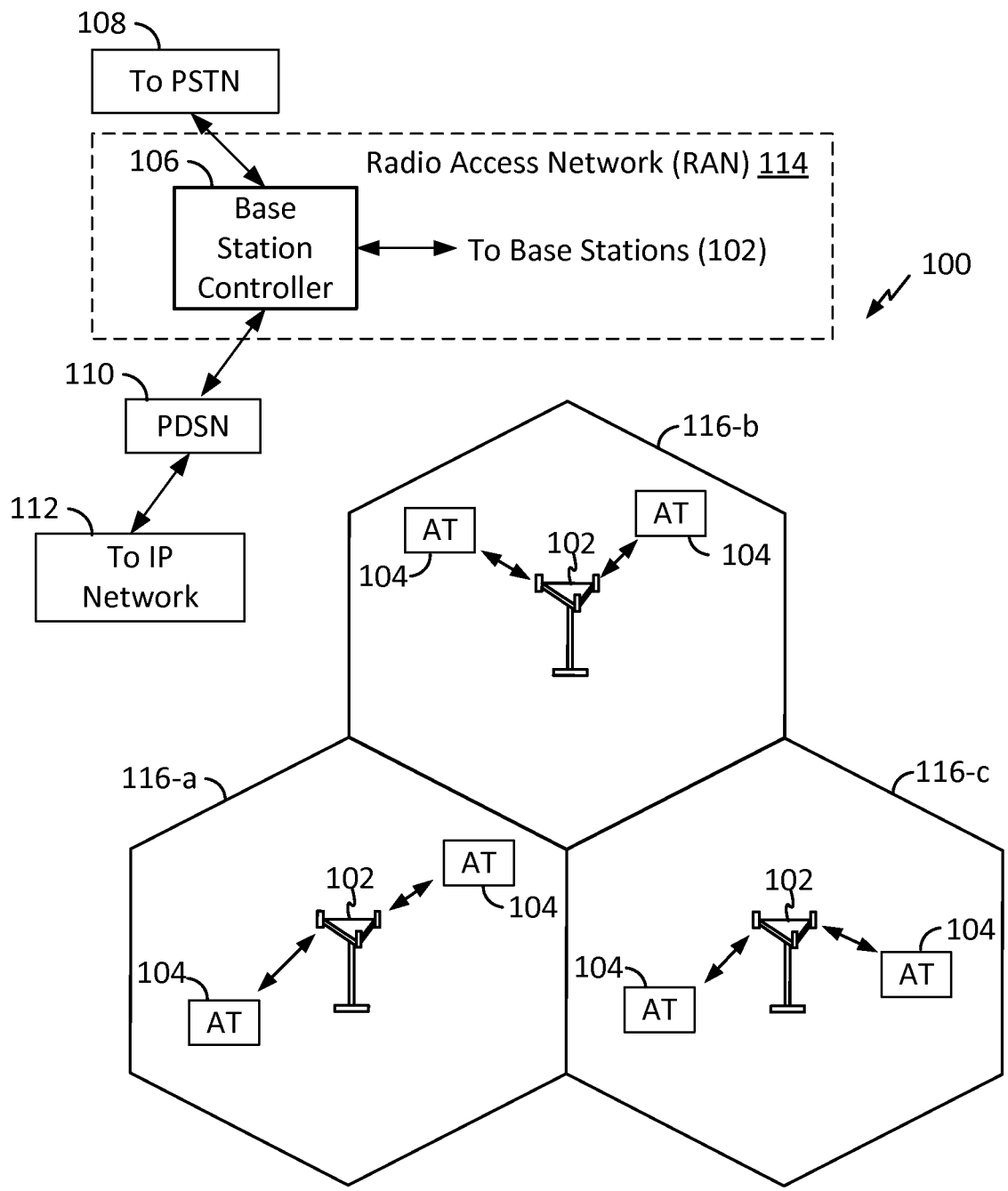
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, a first network 108 providing access to a public switched telephone network (PSTN) (e.g., via a mobile switching center/visitor location register (MSC/VLR)), and a packet data switching node (PDSN) 110, and a second network 112 providing access to an IP network such as the Internet. The base station controller(s) 106 and base stations 102 are components of a access network or radio access network (RAN) 114. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a respective geographic area. The coverage area 116 for each base station 102 here is identified as cells 116-*a*, 116-*b*, or 116-*c*. The coverage area 116 for a base station 102 may be divided into sectors (not shown, but making up only a portion of the coverage area). In a coverage area 116 that is divided into sectors, the multiple sectors within a coverage area 116 can be formed by groups of antennas with each antenna responsible for communication with one or more access terminals 104 in a portion of the cell.

One or more access terminals 104 may be dispersed throughout the coverage areas 116, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base.

The PDSN 110 may be used to facilitate communications between the AT 104 and the IP network 112. In one example, the AT 104 communicates with the IP network 112 via wireless communications via the RAN 114. The AT 104 generates IP packets for the IP network 112 and encapsulates the IP packets into frames destined for the PDSN 110. In several examples, the IP packets are encapsulated using a point-to-point protocol (PPP) and the resultant PPP byte stream is transmitted through a code division multiple access (CDMA) network using a Radio Link Protocol (RLP) (e.g., through the RAN 114).

The AT 104 sends the frames to the RAN 114 by modulating and transmitting the frames through an AT antenna. The frames are received by the RAN 106 through a RAN antenna. The RAN 114 sends the received frames to the PDSN 110, at which the IP packets are extracted from the received frames. After the PDSN 110 extracts the IP packets from the data stream, the PDSN 110 routes the IP packets to the IP network 112. Conversely, the PDSN 110 may send encapsulated frames through the RAN 114 to the AT 104 (e.g., via the base station controller 106 and base stations 102).

In several examples, the PDSN 110 may be used to establish a communication with an AT 104 involving quality of service (QoS). In many cellular wireless telecommunication systems, a QoS mechanism may be implemented to actively control parameters and ensure a certain level of QoS, which can be particularly useful when implementing voice over Internet protocol (VoIP) or streaming audio or video services. As such, many networks deployed according to the EVDO standards (managed by an industry group known as 3GPP2) have implemented QoS.

In an EVDO system that implements QoS, a connection between an IP network (e.g., 112) such as the Internet and the EVDO RAN 114 is moderated by the PDSN 110. The point-to-point protocol (PPP) session is established between the mobile device (e.g., AT 104) and the PDSN 110, and the PDSN 110 communicates with the IP network 112. For QoS, the PDSN 110 utilizes one or more "A10" connections to communicate with the RAN 114. Here, the A10 connections are used to transport data frames between the PDSN 110 and the RAN 114. Generally, multiple A10 connections associated with a particular AT may be grouped together as an A10 "session." Here, the A10 session includes one main A10 connection, and optionally, one or more auxiliary A10 connections.

Figure 2:
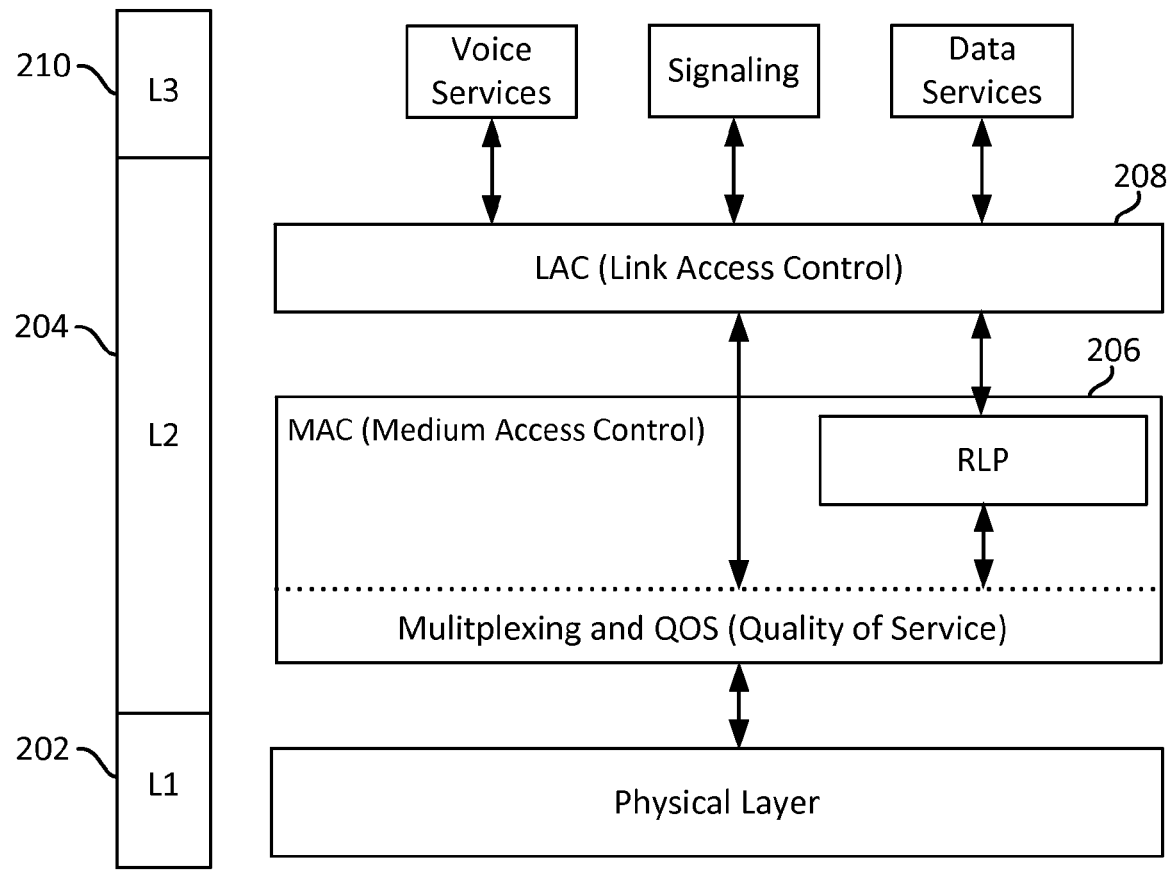
FIG. 2 is a block diagram illustrating an example of a protocol stack architecture which may be implemented by an access terminal.

FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3). Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

Figure 3:
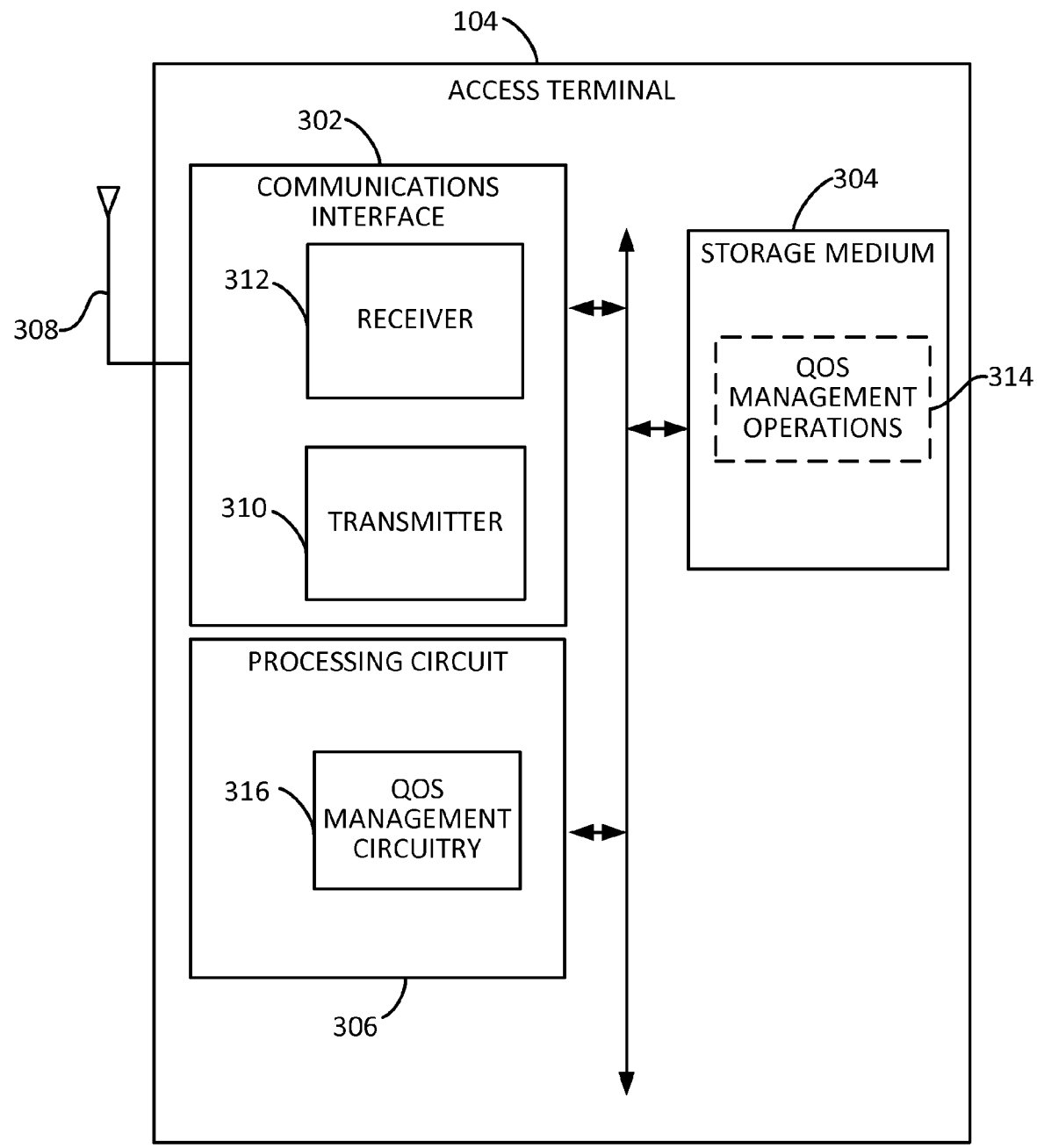
FIG. 3 is a block diagram illustrating select components of an access terminal according to at least one example.

FIG. 3 shows a block diagram illustrating select components of an access terminal 104 according to at least one example of the present disclosure. The access terminal 104 includes a communications interface 302 and a storage medium 304. These components can be coupled to and/or placed in electrical communications with a processing circuit 306.

The communications interface 302 may be adapted to facilitate wireless communications of the access terminal 104. For example, the communications interface 302 may include circuitry and/or programming adapted to facilitate the communication of information bi-directionally with respect to one or more communications devices in a network. The communications interface 302 may be coupled to one or more antennas 308 for wireless communications within a wireless communications system.

The communications interface 302 can be configured with one or more standalone receivers and/or transmitters, as well as one or more transceivers. In the illustrated example, the communications interface 302 includes a transmitter 310 and a receiver 312.

The storage medium 304 may represent one or more computer-readable, machine-readable, and/or processor-readable devices for storing programming, such as processor executable code or instructions (e.g., software, firmware), electronic data, databases, or other digital information. The storage medium 304 may also be used for storing data that is manipulated by the processing circuit 306 when executing programming. The storage medium 304 may be any available media that can be accessed by a general purpose or special purpose processor, including portable or fixed storage devices, optical storage devices, and various other mediums capable of storing, containing or carrying programming. By way of example and not limitation, the storage medium 304 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 304 may be coupled to the processing circuit 306 such that the processing circuit 306 can read information from, and write information to, the storage medium 304. That is, the storage medium 304 can be coupled to the processing circuit 306 so that the storage medium 304 is at least accessible by the processing circuit 306, including examples where at least one storage medium is integral to the processing circuit 306 and/or examples where at least one storage medium is separate from the processing circuit 306 (e.g., resident in the access terminal 104, external to the access terminal 104, distributed across multiple entities).

Programming stored by the storage medium 304, when executed by the processing circuit 306, causes the processing circuit 306 to perform one or more of the various functions and/or process steps described herein. According to at least one example of the access terminal 104, the storage medium 304 may include QoS Management operations 314 adapted for avoiding data loss associated with a QoS reservation failure, as described in further detail below.

The processing circuit 306 is generally adapted for processing, including the execution of such programming stored on the storage medium 304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 306 is arranged to obtain, process and/or send data, control data access and storage, issue commands, and control other desired operations. The processing circuit 306 may include circuitry configured to implement desired programming provided by appropriate media in at least one example. For example, the processing circuit 306 may be implemented as one or more processors, one or more controllers, and/or other structure configured to execute executable programming Examples of the processing circuit 306 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein.

A general purpose processor may include a microprocessor, as well as any conventional processor, controller, microcontroller, or state machine. The processing circuit 306 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 306 are for illustration and other suitable configurations within the scope of the present disclosure are also contemplated.

According to one or more aspects of the present disclosure, the processing circuit 306 may be adapted to perform any or all of the features, processes, functions, steps and/or routines for any or all of the access terminals 104 described herein. As used herein, the term "adapted" in relation to the processing circuit 306 may refer to the processing circuit 306 being one or more of configured, employed, implemented, and/or programmed to perform a particular process, function, step and/or routine according to various features described herein.

According to at least one example of the access terminal 104, the processing circuit 306 may include QoS Management circuitry 316 adapted for avoiding data loss associated with a QoS reservation failure, as described in further detail below, particularly in relation to FIGS. 6-7.

Figure 4:
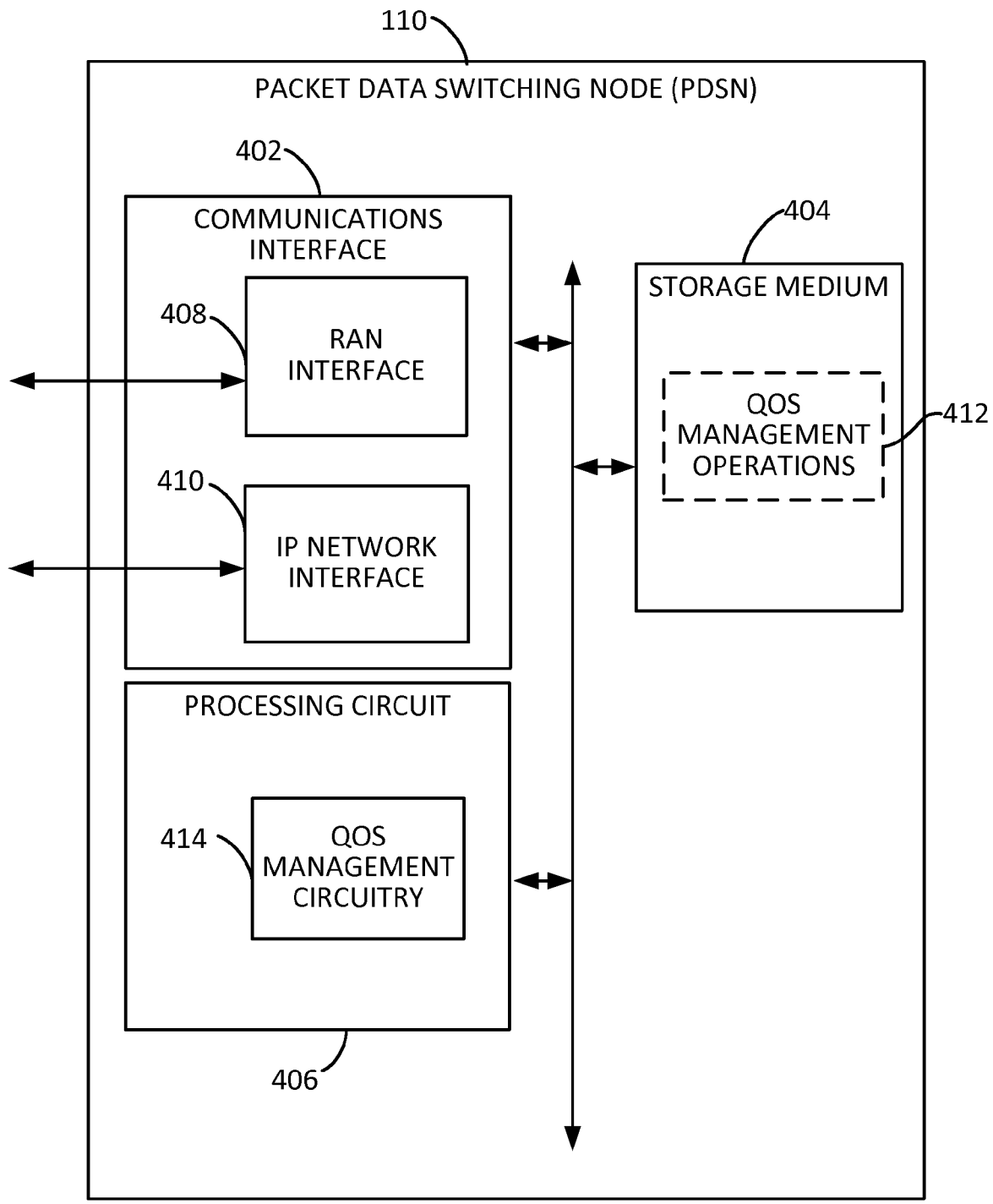
FIG. 4 shows a block diagram illustrating select components of a packet data switching node (PDSN) according to at least one example.

FIG. 4 shows a block diagram illustrating select components of a packet data switching node (PDSN) 110 according to at least one example. The PDSN 110 includes a communications interface 402 and a storage medium 404. These components can be coupled to and/or placed in electrical communications with a processing circuit 406.

The communications interface 402 may be adapted to facilitate communications with a radio area network (RAN) and/or an IP network. For example, the communications interface 402 may include circuitry and/or programming adapted to facilitate the communication of information bi-directionally with respect to one or more communications devices in a network. The communications interface 402 may be coupled to one or more wired or wireless connections for communications within a wireless communications system.

The communications interface 402 can be configured with one or more standalone receivers and/or transmitters, as well as one or more transceivers. In the illustrated example, the communications interface 402 includes a RAN interface 408 for communication with a RAN and an IP network interface 410 for communication with an IP network.

The storage medium 404 may represent one or more computer-readable, machine-readable, and/or processor-readable devices for storing programming, such as processor executable code or instructions (e.g., software, firmware), electronic data, databases, or other digital information. The storage medium 404 may also be used for storing data that is manipulated by the processing circuit 406 when executing programming. The storage medium 404 may be any available media that can be accessed by a general purpose or special purpose processor, including portable or fixed storage devices, optical storage devices, and various other mediums capable of storing, containing or carrying programming. By way of example and not limitation, the storage medium 404 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 404 may be coupled to the processing circuit 406 such that the processing circuit 406 can read information from, and write information to, the storage medium 404. That is, the storage medium 404 can be coupled to the processing circuit 406 so that the storage medium 404 is at least accessible by the processing circuit 406, including examples where at least one storage medium is integral to the processing circuit 406 and/or examples where at least one storage medium is separate from the processing circuit 406 (e.g., resident in the PDSN 110, external to the PDSN 110, distributed across multiple entities).

Programming stored by the storage medium 404, when executed by the processing circuit 406, causes the processing circuit 406 to perform one or more of the various functions and/or process steps described herein. According to at least one example of the PDSN 110, the storage medium 404 may include QoS Management operations 412 adapted for avoiding data loss associated with a QoS reservation failure, as described in further detail below.

The processing circuit 406 is generally adapted for processing, including the execution of such programming stored on the storage medium 404. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 406 is arranged to obtain, process and/or send data, control data access and storage, issue commands, and control other desired operations. The processing circuit 406 may include circuitry configured to implement desired programming provided by appropriate media in at least one example. For example, the processing circuit 406 may be implemented as one or more processors, one or more controllers, and/or other structure configured to execute executable programming Examples of the processing circuit 406 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein.

A general purpose processor may include a microprocessor, as well as any conventional processor, controller, microcontroller, or state machine. The processing circuit 406 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 406 are for illustration and other suitable configurations within the scope of the present disclosure are also contemplated.

According to one or more aspects of the present disclosure, the processing circuit 406 may be adapted to perform any or all of the features, processes, functions, steps and/or routines for any or all of the PDSNs 110 described herein. As used herein, the term "adapted" in relation to the processing circuit 406 may refer to the processing circuit 406 being one or more of configured, employed, implemented, and/or programmed to perform a particular process, function, step and/or routine according to various features described herein.

According to at least one example of the PDSN 110, the processing circuit 406 may include QoS Management circuitry 414 adapted for avoiding data loss associated with a QoS reservation failure, as described in further detail below, particularly in relation to FIGS. 6-7.

Figure 5:
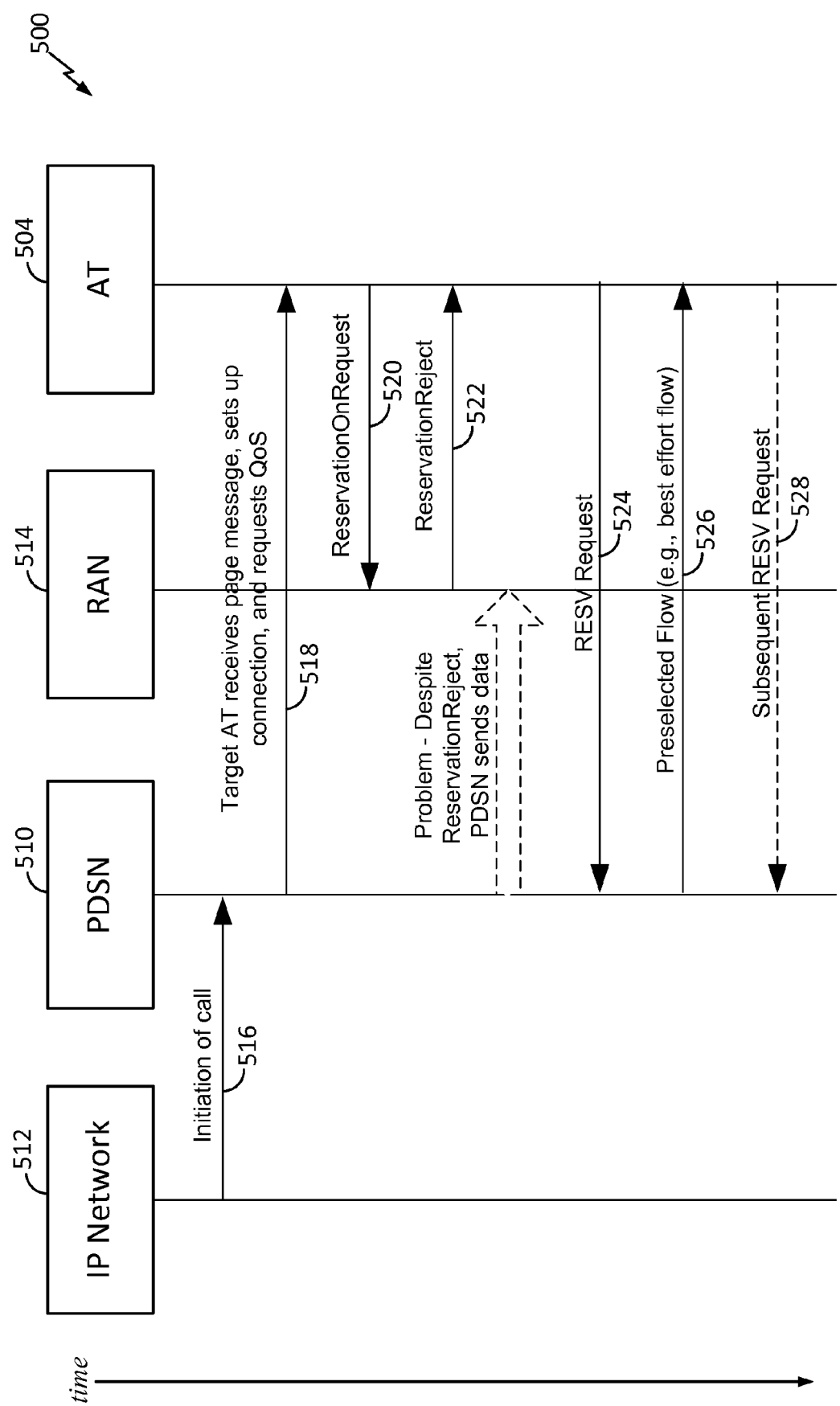
FIG. 5 illustrates a diagram of an exemplary process for avoiding data loss after a quality of service (QoS) reservation failure according to at least one example.

FIG. 5 illustrates a diagram of an exemplary process 500 for avoiding data loss associated with a quality of service (QoS) reservation failure according to at least one example. The process involves several components of a network environment, such as the network environment described above with reference to FIG. 1, including an IP network 512, a packet data serving node (PDSN) 510, a radio access network (RAN) 514, and an access terminal (AT) 504. These components may be arranged to communicate as described previously. In one example, the IP network 512 is the Internet or a network coupled to the Internet.

To establish a connection with the AT 504 for a preselected communication employing QoS such as a VoIP call, the IP network 512 may contact the PDSN 510 to initiate the call (516). In one example, the preselected communication may be a voice over Internet Protocol (VoIP) call or another such data stream that may benefit from QoS. In response, the PDSN 510 may send one or more data packets to the RAN 514 causing the RAN 514 to generate and transmit a page message for the target AT 504. The data packets may contain information indicating that a certain level of QoS will be requested in association with the preselected communication.

To support paging with QoS, the RAN 514 may be configured to determine QoS of incoming packets that trigger generation of the page messages. RAN 514 may include QoS information in each page message (or in only certain page messages). In general, the QoS information may include any information that may be useful in handling a page message and/or in responding to the page message. In one design, the QoS information comprises a delay sensitive bit that may be set to '1' if a page message is delay sensitive or to '0' if the page message is delay insensitive. In another design, the QoS information indicates the maximum allowable delay for a page message. In yet another design, the QoS information indicates a page type of a page message being sent. A recipient access terminal may behave differently for different page types. The QoS information may also convey other information.

A page message may also be referred to as a page, a paging message, etc. Each page message may have a fixed size or a variable size. In one example, page messages may be sent in a manner to reduce the number of PHY packets while minimally impacting performance. Page messages may be sent for various purposes such as to alert ATs to incoming calls or data, to update the status of applications running on the ATs, etc. Some page messages may be time critical while many page messages may not be sensitive to delay. For example, page messages may be sent for push-based email applications to keep the emails of ATs up to date, and these page messages are typically not time critical. In one example involving EVDO, a page message may be send using a best effort or other suitable flow.

As the PDSN 510 may send one or more data packets to the RAN 514, the PDSN 510 may also generate a traffic flow template (TFT) to manage and classify the connection to the RAN 514 and AT 504 for the requested QoS communication (e.g., VoIP call). Once stored in the PDSN 510, the TFT enables packet classification and policing for downlink data transfer, also referred to as packet data flow. Thus, the TFT allows the PDSN 510 to forward incoming downlink traffic for the AT 504 to the most appropriate and efficient service instance, and in some cases, as determined by the AT 504 itself. For this, packet filters are matched to types of incoming downlink traffic. TFTs are discussed in greater detail in U.S. Patent. Appl. No. 2003/0039259, entitled, "Traffic flow template for managing packet data flows", the entire content of which is incorporated herein by reference.

Returning now to the actions illustrated on FIG. 5 and after the PDSN 510 has contacted the RAN 514, the target AT 504 may receive (518) the page message and then set up a wireless connection (e.g., traffic channel) between the AT 504 and the RAN 514. Once the target AT 504 recognizes that the page message includes QoS information and the wireless connection is established (e.g., AT 504 has set up the traffic channel and may receive an announce message from the RAN 514 using an application level communication software program such as QChat), the AT 504 may transmit to the RAN 514 a request for QoS management. To do so, the AT 504 transmits (520) a ReservationOnRequest message to the RAN 514. In one example, the ReservationOnRequest message is effectively triggered or generated by the QChat program (e.g., client software enabling push to talk communication between ATs) at the AT 504 after receipt of the announce message from the RAN 514. In such case, the ReservationOnRequest message is not directly triggered by the page message. Further information on the set up of the wireless connection between the AT 504 and the RAN 514 is provided in U.S. Patent. Appl. No. 2011/0211439, entitled, "QUALITY OF SERVICE (QoS) ACQUISITION AND PROVISIONING WITHIN A WIRELESS COMMUNICATIONS SYSTEM", the entire content of which is incorporated herein by reference. The ReservationOnRequest message is defined in the 3GPP2 specifications and allows the AT 504 to request from the RAN 514 an assigned traffic channel, where the message includes a profile ID that specifies a type of packet flow (e.g., VoIP packet flow or other QoS packet flows) being requested.

Profile IDs (e.g., QoS profiles) are a mechanism to specify (or predefine) relevant air interface parameters and network QoS requirements for a data service. It is a 'shorthand' identifier that a AT uses when requesting a QoS reservation for a flow with a RAN. Standard Profile ID assignments available for various data services are described in TSB58-G Administration of Parameter Value Assignments for cdma2000 Spread Spectrum Standards, the entire content of which is incorporated herein by reference. In addition to the VoIP packet flow that may be specified in the profile ID, other QoS packet flows that may be specified in the profile ID include IM packet flows, push-to-talk (PTT) packet flows, streaming-video packet flows, streaming-audio packet flows, video-telephony packet flows, and conversational media control signal (CMCS) flows.

Returning now to the actions illustrated on FIG. 5, despite the QoS reservation request (520) from the AT 504, the RAN 514 may reject the request depending on the available QoS resources and capabilities at the base station. In such case, the RAN 514 may respond with a ReservationReject message 522, thereby denying the request for a QoS flow management/communication. The ReservationReject message is defined in the 3GPP2 specifications and further discussion of uses thereof can be found in U.S. Pat. No. 8,265,679, entitled, "Bundling of communication signals for efficiency", the entire content of which is incorporated herein by reference.

In conventional systems, the PDSN 510 is not notified of this situation (e.g., the ReservationReject message 522 from the RAN 514) and thus would continue to send data packets corresponding to the VoIP call or other data stream to the RAN 514 (e.g., over an auxiliary A10 connection). However, because the QoS request from the AT 504 was rejected, the QoS flow between the RAN 514 and the AT 504 does not exist, and therefore, the RAN 514 will discard the data packets.

In the exemplary process 500, however, the AT 504 may respond to the ReservationReject message 522 by sending a RESV request message 524 to the PDSN 510, optionally including the IP address of the AT 504. The RESV message 524 is known in the art, as part of the standardized transport layer protocol called Resource Reservation Protocol (RSVP) and is defined in RFC 2205, entitled "Resource ReSerVation Protocol (RSVP)", which is available from the Internet Engineering Task Force (IETF). The RSVP protocol allows an application to dynamically reserve network bandwidth. More specifically, RSVP enables applications to request a specific QoS for a data flow.

Now when the PDSN 510 receives the RESV request from the AT 504, it is informed that the requested (e.g., previously reserved) traffic flow template (TFT) has been rejected by the RAN 514, and in response, the PDSN 510 may reserve certain other resources for the IP address indicated in that RESV message (e.g., the AT 504 IP address). The PDSN 510 may then transmit (526) the QoS type communication (e.g., VoIP call) over a an alternate preselected flow. For example, instead of using a QoS flow, the PDSN may utilize a "best effort" (BE) flow, which is a feature/service that is already available on the PDSN, to send VoIP data or other appropriate data. In several aspects, the PDSN 510 is thus enabled to send data to the RAN 514 over the best effort flow, which can successfully reach the AT 504. In one example, the BE flow is configured when a traffic channel is set up. In one example, when the PDSN 510 receives the RESV request from the AT 504, the PDSN 510 modifies the original configuration (e.g., first configuration) of the TFT to support only the BE flow. In this case, the TFT has a second or modified configuration which may have eliminated the original QoS flow that was rejected.

The best effort flow (e.g., best effort service) is one level of three end to end type data flows with different service levels that may be available for use at a PDSN. The other two other data flows include expedited forwarding (EF) and assured forwarding (AF). The EF data flow may be defined as a data flow with a delay bound requirement, while the AF data flow may be defined as a data flow with an average throughput requirement. In contrast, the best effort (BE) flow may be defined as a data flow having no delay bound or throughput requirements, which is also known as lack of QoS, and essentially provides basic connectivity with no guarantees. The EF flows and AF flows have QoS requirements and are two types of QoS flows. The BE flows have no QoS requirements and are non-QoS flows. An example of an EF flow is a voice over IP (VoIP) flow. An example of an AF flow is a streaming video flow. An example of a BE flow is a data flow for data download. A scheduler may give the highest priority to EF flows, the next highest priority to AF flows, and the lowest priority to BE flows. Additional information regarding these and other data flows is provided in U.S. Pat. No. 8,014,280, entitled, "Admission control based on QoS performance in a wireless communication network", the entire content of which is incorporated herein by reference.

Returning now to the actions illustrated on FIG. 5, in some examples, the AT 504 may also transmit a subsequent RESV request 528 to the PDSN 510, so that the PDSN 510 may add the rejected QoS flow back into the original TFT for usage during the next VoIP call or other preselected communication. In such case, the transmission of the subsequent RESV request 528 may cause the PDSN 510 to restore the TFT to the original configuration (e.g., first TFT configuration) so that future communications are not restricted to the preselected flow (e.g., BE flow) in the modified TFT (e.g., second TFT configuration). In one example, the subsequent RESV request 528 also includes the IP address of the AT 504.

In some examples, the requested QoS communication may be a VoIP call, a data streaming communication, or other such communication that may benefit from QoS. In one aspect, instead of issuing the ReservationReject message 522, the RAN 514 is able to allocate the appropriate QoS resources and grants the QoS request to the AT 504, thereby enabling a QoS flow (e.g., EF data flow) between the PDSN 510 and the AT 504. In another aspect, the RAN 514 is able to allocate the appropriate QoS resources and grants a subsequent QoS request to the AT 504, thereby enabling a QoS flow between the PDSN 510 and the AT 504 either after an initial QoS rejection or after an initial successful QoS communication.

Figure 6:
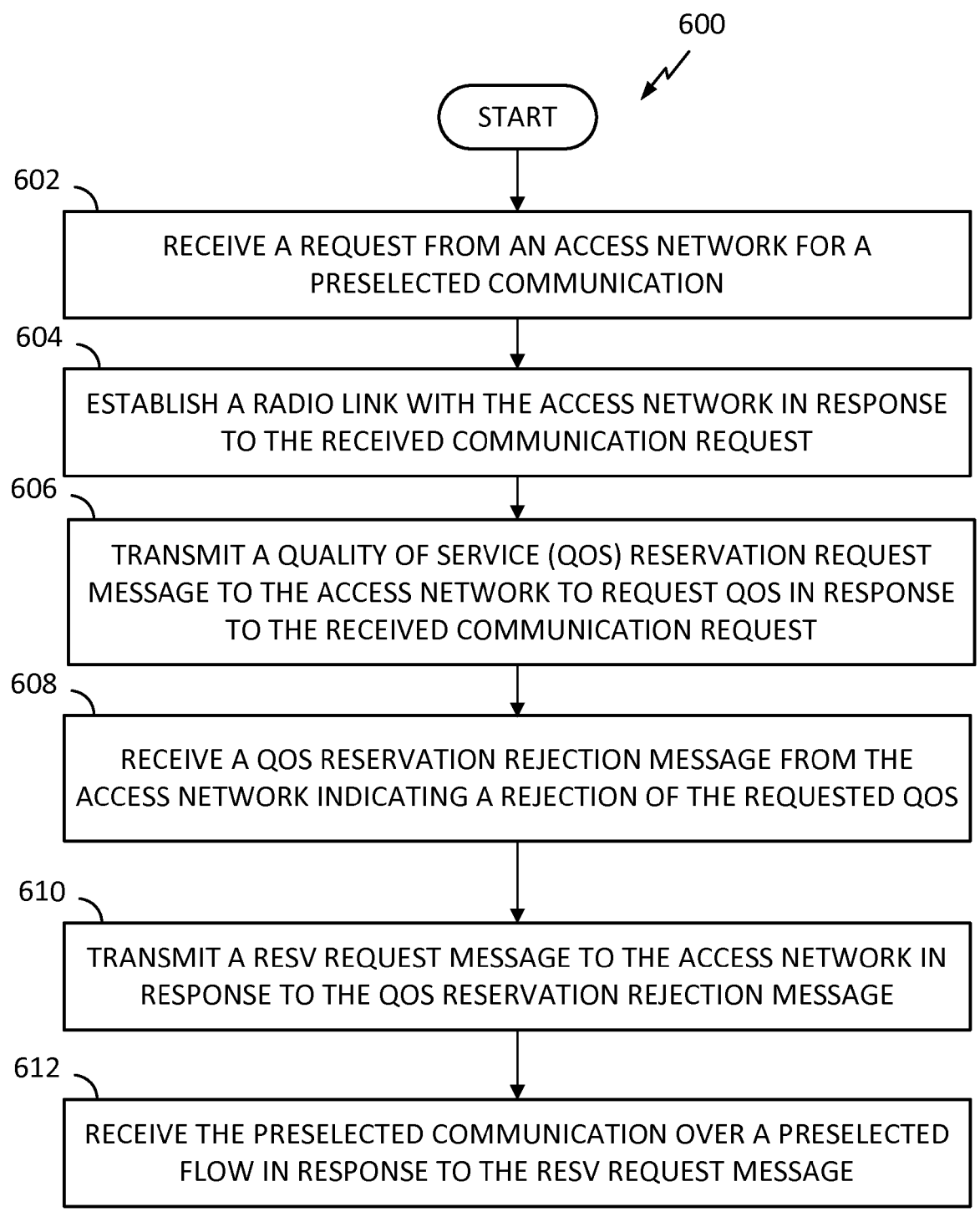
FIG. 6 is a flow chart illustrating a method for avoiding data loss associated with a QoS reservation failure at an access terminal according to one example.

FIG. 6 is a flow chart illustrating a method 600 for avoiding data loss associated with a QoS reservation failure at an access terminal according to one example. In particular examples, the method 600 can be used in conjunction with any of the access terminals described above with particular reference to those of FIGS. 1 through 5. The method first receives (602) a request from an access network for a preselected communication. In one aspect the preselected communication involves a VoIP call, a data streaming communication, a QoS communication, and/or another suitable communication. The method then establishes (604) a radio link with the access network in response to the received communication request. In several examples, the access network is a RAN.

The method then transmits (606) a quality of service (QoS) reservation request message to the access network to request QoS in response to the received communication request. The method receives (608) a QoS reservation rejection message from the access network indicating a rejection of the requested QoS. In some aspects, the access network (e.g., RAN) may not send the QoS reservation rejection message and a QoS communication between a PDSN and the AT can take place.

The method then transmits (610) a RESV request message to the access network in response to the QoS reservation rejection message. In several examples, the RESV request message includes the IP address of the AT and is sent to a PDSN in the access network. The method then receives (612) the preselected communication over a preselected flow in response to the RESV request message. In several examples, the preselected flow is a best efforts or similar such flow. In one or more aspects, the method also transmits a subsequent RESV request message to the access network (e.g., PDSN) in response to the QoS reservation rejection message. In such case, the PDSN can modify the TFT to include the rejected QoS flow for usage during the next VoIP call (e.g., restore the TFT to the original configuration that includes the rejected QoS flow).

In one example, the method can perform the sequence of actions in a different order. In another example, the method can skip one or more of the actions. In other examples, one or more of the actions are performed simultaneously. In some examples, additional actions can be performed.

Figure 7:
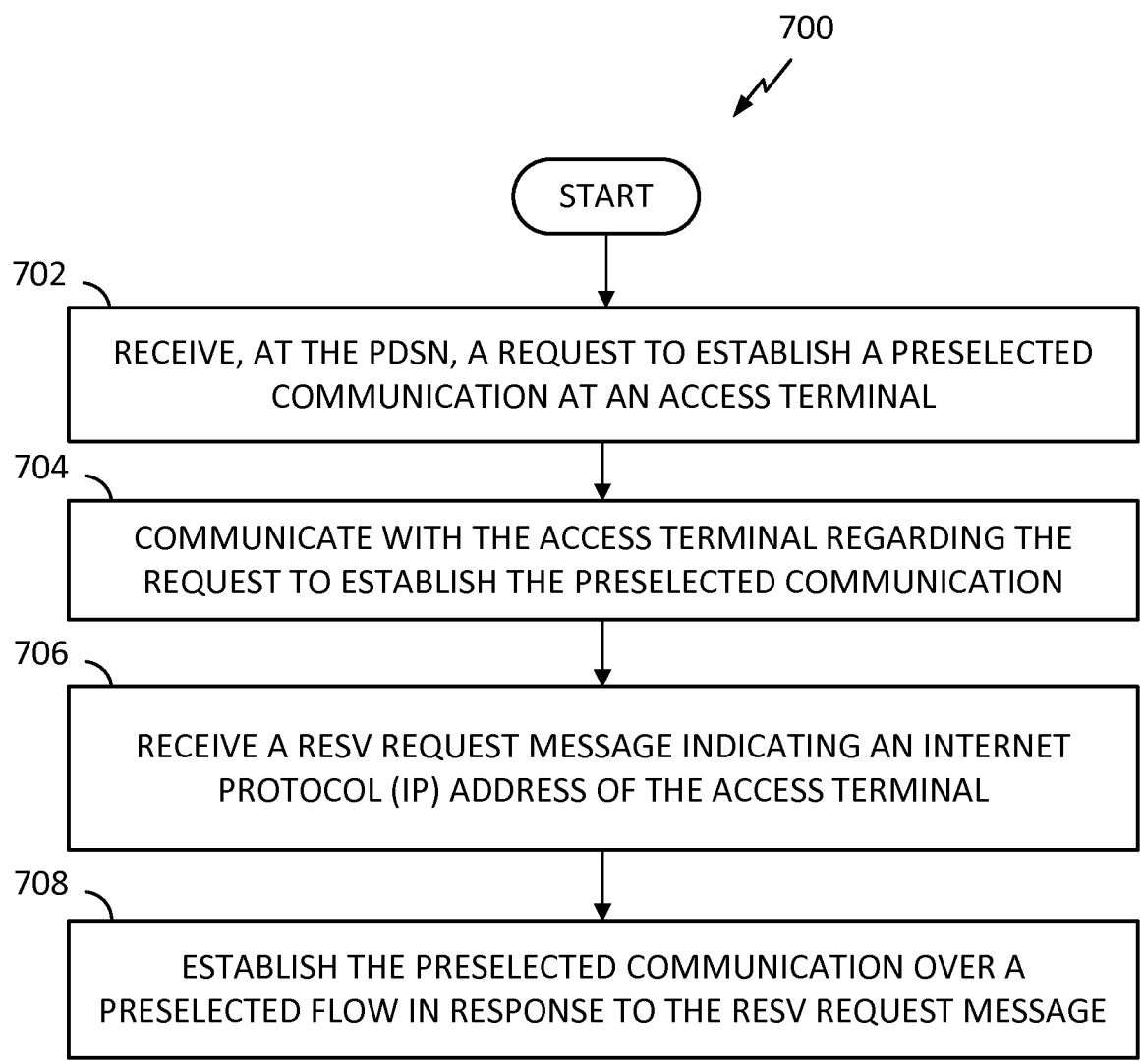
FIG. 7 is a flow chart illustrating a method for avoiding data loss associated with a QoS reservation failure at a packet data serving node (PDSN) according to one example.

FIG. 7 is a flow chart illustrating a method 700 for avoiding data loss associated with a QoS reservation failure at a packet data serving node (PDSN) according to one example. In particular examples, the method 700 can be used in conjunction with any of the PDSNs described above, such as those described in FIG. 2 or FIG. 5. The method first receives (702), at the PDSN, a request to establish a preselected communication at an access terminal. In one aspect the preselected communication is a VoIP call, a data streaming communication, a QoS communication, and/or another suitable communication. The method then communicates (704) with the access terminal regarding the request to establish the preselected communication. In several examples, the PDSN communicates over one or more A10 connections with a RAN which transmits a page message to the target AT notifying the AT of the requested preselected communication and the associated requirements (e.g., QoS requirements). In several examples, the method generates a traffic flow template (TFT) for the requested preselected communication with a first configuration.

The method then receives (706) a RESV request message indicating an Internet Protocol (IP) address of the access terminal. In one aspect, the RESV request message is sent in response to a RAN issuing a reservation reject message. In several examples, the method also modifies, in response to the RESV request message, the TFT (e.g., to have a second TFT configuration) for the requested communication to support only a preselected flow (e.g., alternative flow such as BE flow). The method then establishes (708) the preselected communication over the preselected flow in response to the RESV request message. In one aspect the preselected communication involves a VoIP call, a data streaming communication, a QoS communication, and/or another suitable communication.

In one or more aspects, the method also receives a subsequent RESV request message from the AT. In such case, the PDSN can modify the TFT with the second configuration to include the rejected QoS flow for usage during the next VoIP call (e.g., restore the TFT to the original or first configuration that includes the rejected QoS flow).

In one example, the method can perform the sequence of actions in a different order. In another example, the method can skip one or more of the actions. In other examples, one or more of the actions are performed simultaneously. In some examples, additional actions can be performed.

While the above discussed aspects, arrangements, and embodiments are discussed with specific details and particularity, one or more of the components, steps, features and/or functions illustrated in FIGS. 1, 2, 3 and/or 4 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2, 3 and/or 4 may be configured to perform or employ one or more of the methods, features, parameters, or steps described in FIGS. 5, 6, and/or 7. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

The invention claimed is:

1. A method of wireless communication operable at an access terminal, the method comprising:
receiving a request from an access network for a preselected communication;
establishing a radio link with the access network in response to the received request;
transmitting a Quality of Service (QoS) reservation request message to the access network to request QoS in response to the received communication request;
receiving a QoS reservation rejection message from the access network indicating a rejection of the requested QoS;
transmitting a RESV request message to the access network in response to the QoS reservation rejection message; and
receiving the preselected communication over a preselected flow in response to the RESV request message.

2. The method of claim 1, wherein the preselected flow is a best effort flow.

3. The method of claim 1, wherein the preselected communication is at least one of a voice over Internet Protocol (VoIP) call, an instant message flow, a push-to-talk flow, a streaming video flow, a streaming audio flow, a video telephony flow, or a conversational media control signal flow.

4. The method of claim 1, further comprising transmitting a second RESV request message to the access network.

5. The method of claim 4, wherein the transmitting the second RESV request message to the access network comprises transmitting the second RESV request message to a packet data serving node (PDSN), wherein the second RESV request message comprises an Internet Protocol (IP) address of the access terminal.

6. The method of claim 4, further comprising:
receiving a second request from the access network for a voice over Internet Protocol (VoIP) call;
establishing a radio link with the access network in response to the second received request for the VoIP call;
transmitting a second QoS reservation request message to the access network to request QoS in response to the second received request for the VoIP call; and
receiving the VoIP call over a QoS flow in response to the second QoS reservation request message.

7. The method of claim 1, wherein the preselected communication is a voice over Internet Protocol (VoIP) call, the method further comprising:
receiving a second request from the access network for a second VoIP call;
establishing a radio link with the access network in response to the second received request for the second VoIP call;
transmitting a second QoS reservation request message to the access network to request QoS in response to the second received request for the second VoIP call; and
receiving the second VoIP call over a QoS flow in response to the second QoS reservation request message.

8. The method of claim 1, further comprising:
generating, at a packet data serving node (PDSN), a traffic flow template for the requested preselected communication with a first configuration; and
modifying, in response to the RESV request message, the traffic flow template to have a second configuration for the preselected flow.

9. The method of claim 8, further comprising:
transmitting, at the access terminal, a second RESV request message to the access network indicating an Internet Protocol (IP) address of the access terminal; and
restoring, at the PDSN, the traffic flow template to have the first configuration.

10. The method of claim 1, wherein the transmitting the RESV request message to the access network in response to the QoS reservation rejection message comprises:
transmitting the RESV request message to a packet data serving node (PDSN) indicating an Internet Protocol (IP) address of the access terminal in response to the QoS reservation rejection message.

11. An access terminal configured for wireless communication, the access terminal comprising:
means for receiving a request from an access network for a preselected communication;
means for establishing a radio link with the access network in response to the received request;
means for transmitting a Quality of Service (QoS) reservation request message to the access network to request QoS in response to the received communication request;
means for receiving a QoS reservation rejection message from the access network indicating a rejection of the requested QoS;
means for transmitting a RESV request message to the access network in response to the QoS reservation rejection message; and
means for receiving the preselected communication over a preselected flow in response to the RESV request message.

12. The access terminal of claim 11, wherein the preselected flow is a best effort flow.

13. The access terminal of claim 11, wherein the preselected communication is at least one of a voice over Internet Protocol (VoIP) call, an instant message flow, a push-to-talk flow, a streaming video flow, a streaming audio flow, a video telephony flow, or a conversational media control signal flow.

14. The access terminal of claim 11, further comprising a means for transmitting a second RESV request message to the access network.

15. The access terminal of claim 14, wherein the means for transmitting the second RESV request message to the access network comprises means for transmitting the second RESV request message to a packet data serving node (PDSN), wherein the second RESV request message comprises an Internet Protocol (IP) address of the access terminal.

16. The access terminal of claim 14, further comprising:
means for receiving a second request from the access network for a voice over Internet Protocol (VoIP) call;
means for establishing a radio link with the access network in response to the second received request for the VoIP call;
means for transmitting a second QoS reservation request message to the access network to request QoS in response to the second received request for the VoIP call; and
means for receiving the VoIP call over a QoS flow in response to the second QoS reservation request message.

17. The access terminal of claim 11, wherein the preselected communication is a voice over Internet Protocol (VoIP) call, the access terminal further comprising:
means for receiving a second request from the access network for a second VoIP call;
means for establishing a radio link with the access network in response to the second received request for the second VoIP call;
means for transmitting a second QoS reservation request message to the access network to request QoS in response to the second received request for the second VoIP call; and
means for receiving the second VoIP call over a QoS flow in response to the second QoS reservation request message.

18. The access terminal of claim 11, further comprising:
means for generating, at a packet data serving node (PDSN), a traffic flow template for the requested preselected communication with a first configuration; and
means for modifying, in response to the RESV request message, the traffic flow template to have a second configuration for the preselected flow.

19. The access terminal of claim 18, further comprising:
means for transmitting, at the access terminal, a second RESV request message to the access network indicating the Internet Protocol (IP) address of the access terminal; and
means for restoring, at the PDSN, the traffic flow template to have the first configuration.

20. The access terminal of claim 11, wherein the means for transmitting the RESV request message to the access network in response to the QoS reservation rejection message comprises:
means for transmitting the RESV request message to a packet data serving node (PDSN) indicating an Internet Protocol (IP) address of the access terminal in response to the QoS reservation rejection message.

21. An access terminal configured for wireless communication, the access terminal comprising:
a processing circuit;
a memory coupled to the processing circuit; and
a communications interface coupled to the processing circuit, wherein the processing circuit is configured to:
receive a request from an access network for a preselected communication;
establish a radio link with the access network in response to the received request;
transmit a Quality of Service (QoS) reservation request message to the access network to request QoS in response to the received communication request;
receive a QoS reservation rejection message from the access network indicating a rejection of the requested QoS;
transmit a RESV request message to the access network in response to the QoS reservation rejection message; and
receive the preselected communication over a preselected flow in response to the RESV request message.

22. The access terminal of claim 21, wherein the preselected flow is a best effort flow.

23. The access terminal of claim 21, wherein the preselected communication is at least one of a voice over Internet Protocol (VoIP) call, an instant message flow, a push-to-talk flow, a streaming video flow, a streaming audio flow, a video telephony flow, or a conversational media control signal flow.

24. The access terminal of claim 21, wherein the processing circuit is further configured to transmit a second RESV request message to the access network.

25. The access terminal of claim 24, wherein the processing circuit is further configured to transmit the second RESV request message to a packet data serving node (PDSN), wherein the second RESV request message comprises an Internet Protocol (IP) address of the access terminal.

26. The access terminal of claim 24, wherein the processing circuit is further configured to:
receive a second request from the access network for a voice over Internet Protocol (VoIP) call;
establish a radio link with the access network in response to the second received request for the VoIP call;
transmit a second QoS reservation request message to the access network to request QoS in response to the second received request for the VoIP call; and
receive the VoIP call over a QoS flow in response to the second QoS reservation request message.

27. The access terminal of claim 21, wherein:
the preselected communication is a voice over Internet Protocol (VoIP) call; and
the processing circuit is further configured to:
receive a second request from the access network for a second VoIP call;
establish a radio link with the access network in response to the second received request for the second VoIP call;
transmit a second QoS reservation request message to the access network to request QoS in response to the second received request for the second VoIP call; and
receive the second VoIP call over a QoS flow in response to the second QoS reservation request message.

28. The access terminal of claim 21, further comprising a second processing circuit at a packet data serving node (PDSN), the second processing circuit configured to:
generate a traffic flow template for the requested preselected communication with a first configuration; and
modify, in response to the RESV request message, the traffic flow template to have a second configuration for the preselected flow.

29. The access terminal of claim 28, wherein:
the processing circuit is further configured to transmit a second RESV request message to the access network indicating an Internet Protocol (IP) address of the access terminal; and
the second processing circuit is further configured to restore the traffic flow template to have the first configuration.

30. The access terminal of claim 21, wherein the processing circuit is further configured to transmit the RESV request message to a packet data serving node (PDSN) indicating an Internet Protocol (IP) address of the access terminal in response to the QoS reservation rejection message.

31. A computer program product, comprising:
a non-transitory computer-readable storage medium operative at an access terminal configured for wireless communication, the non-transitory computer-readable storage medium comprising instructions for causing a computer to:
receive a request from an access network for a preselected communication;
establish a radio link with the access network in response to the received communication request;
transmit a Quality of Service (QoS) reservation request message to the access network to request QoS in response to the received request;
receive a QoS reservation rejection message from the access network indicating a rejection of the requested QoS;
transmit a RESV request message to the access network in response to the QoS reservation rejection message; and
receive the preselected communication over a preselected flow in response to the RESV request message.

32. The computer program product of claim 31, wherein the preselected flow is a best effort flow.

33. The computer program product of claim 31, wherein the preselected communication is at least one of a voice over Internet Protocol (VoIP) call, an instant message flow, a push-to-talk flow, a streaming video flow, a streaming audio flow, a video telephony flow, or a conversational media control signal flow.

34. The computer program product of claim 31, wherein the non-transitory computer-readable storage medium further comprises instructions for causing the computer to transmit a second RESV request message to the access network.

35. The computer program product of claim 34, wherein the non-transitory computer-readable storage medium further comprises instructions for causing the computer to transmit the second RESV request message to a packet data serving node (PDSN), wherein the second RESV request message comprises an Internet Protocol (IP) address of the access terminal.

36. The computer program product of claim 34, wherein the non-transitory computer-readable storage medium further comprises instructions for causing the computer to:
receive a second request from the access network for a voice over Internet Protocol (VoIP) call;
establish a radio link with the access network in response to the second received request for the VoIP call;
transmit a second QoS reservation request message to the access network to request QoS in response to the second received request for the VoIP call; and
receive the VoIP call over a QoS flow in response to the second QoS reservation request message.

37. The computer program product of claim 31, wherein:
the preselected communication is a voice over Internet Protocol (VoIP) call; and
the non-transitory computer-readable storage medium further comprises instructions for causing the computer to:
receive a second request from the access network for a second VoIP call;
establish a radio link with the access network in response to the second received request for the second VoIP call;
transmit a second QoS reservation request message to the access network to request QoS in response to the second received request for the second VoIP call; and
receive the second VoIP call over a QoS flow in response to the second QoS reservation request message.

38. The computer program product of claim 31, further comprising a second non-transitory computer-readable storage medium operative at a packet data serving node (PDSN) configured for wireless communication, the second non-transitory computer-readable medium comprising instructions for causing a second computer to:
generate a traffic flow template for the requested preselected communication with a first configuration; and
modify, in response to the RESV request message, the traffic flow template to have a second configuration for the preselected flow.

39. The computer program product of claim 38, wherein:
the non-transitory computer-readable storage medium further comprises instructions for causing the computer to transmit, at the access terminal, a second RESV request message to the access network indicating an Internet Protocol (IP) address of the access terminal; and
the second non-transitory computer-readable storage medium further comprises instructions for causing the second computer to restore the traffic flow template to have the first configuration.

40. The computer program product of claim 31, wherein the non-transitory computer-readable storage medium further comprises instructions for causing the computer to transmit the RESV request message to a packet data serving node (PDSN) indicating an Internet Protocol (IP) address of the access terminal in response to the QoS reservation rejection message.

41. A method of wireless communication operable at a packet data serving node (PDSN), the method comprising:
receiving, at the PDSN, a request to establish a preselected communication at an access terminal;
communicating with the access terminal regarding the request to establish the preselected communication;
receiving, in response to a radio access network issuing a reservation reject message, a RESV request message indicating an Internet Protocol (IP) address of the access terminal; and
establishing the preselected communication over a preselected flow in response to the RESV request message.

42. The method of claim 41, wherein the preselected flow is a best effort flow.

43. The method of claim 41, wherein the preselected communication is at least one of a voice over Internet Protocol (VoIP) call, an instant message flow, a push-to-talk flow, a streaming video flow, a streaming audio flow, a video telephony flow, or a conversational media control signal flow.

44. The method of claim 41, wherein:
the preselected communication is a voice over Internet Protocol (VoIP) call;
the receiving, at the PDSN, the request to establish the preselected communication at the access terminal comprises generating a traffic flow template for the requested preselected communication with a first configuration; and the method further comprises modifying, in response to the RESV request message, the traffic flow template to have a second configuration for the VoIP call.

45. The method of claim 44, further comprising:
receiving a second RESV request message indicating an Internet Protocol (IP) address of the access terminal; and
restoring the traffic flow template to have the first configuration.

46. A packet data serving node (PDSN) configured for wireless communication, the PDSN comprising:
means for receiving, at the PDSN, a request to establish a preselected communication at an access terminal;
means for communicating with the access terminal regarding the request to establish the preselected communication;
means for receiving, in response to a radio access network issuing a reservation reject message, a RESV request message indicating an Internet Protocol (IP) address of the access terminal; and
means for establishing the preselected communication over a preselected flow in response to the RESV request message.

47. The PDSN of claim 46, wherein the preselected flow is a best effort flow.

48. The PDSN of claim 46, wherein the preselected communication is at least one of a voice over Internet Protocol (VoIP) call, or a data streaming flow.

49. The PDSN of claim 46, wherein:
the preselected communication is a voice over Internet Protocol (VoIP) call; and
the PDSN further comprises:
means for generating a traffic flow template for the requested preselected communication with a first configuration,
means for modifying, in response to the RESV request message, the traffic flow template to have a second configuration for the VoIP call.

50. The PDSN of claim 49, further comprising:
means for receiving a second RESV request message indicating the IP address of the access terminal; and
means for restoring the traffic flow template to have the first configuration.

51. A packet data serving node (PDSN) configured for wireless communication, the PDSN comprising:
a processing circuit;
a memory coupled to the processing circuit; and
a communications interface coupled to the processing circuit, wherein the processing circuit is configured to:
receive, at the PDSN, a request to establish a preselected communication at an access terminal;
communicate with the access terminal regarding the request to establish the preselected communication;
receive, in response to a radio access network issuing a reservation reject message, a RESV request message indicating an Internet Protocol (IP) address of the access terminal; and
establish the preselected communication over a preselected flow in response to the RESV request message.

52. The PDSN of claim 51, wherein the preselected flow is a best effort flow.

53. The PDSN of claim 51, wherein the preselected communication is at least one of a voice over Internet Protocol (VoIP) call, an instant message flow, a push-to-talk flow, a streaming video flow, a streaming audio flow, a video telephony flow, or a conversational media control signal flow.

54. The PDSN of claim 51, wherein:
the preselected communication is a voice over Internet Protocol (VoIP) call; and
the processing circuit is further configured to:
generate a traffic flow template for the requested preselected communication with a first configuration, and
modify, in response to the RESV request message, the traffic flow template to have a second configuration for the VoIP call.

55. The PDSN of claim 54, wherein the processing circuit is further configured to:
receive a second RESV request message indicating the IP address of the access terminal; and
restore the traffic flow template to have the first configuration.

56. A computer program product, comprising:
a non-transitory computer-readable storage medium operative at a packet data serving node (PDSN) configured for wireless communication, the non-transitory computer-readable storage medium comprising instructions for causing a computer to:
receive, at the PDSN, a request to establish a preselected communication at an access terminal;
communicate with the access terminal regarding the request to establish the preselected communication;
receive, in response to a radio access network issuing a reservation reject message, a RESV request message indicating an Internet Protocol (IP) address of the access terminal; and
establish the preselected communication over a preselected flow in response to the RESV request message.

57. The computer program product of claim 56, wherein the preselected flow is a best effort flow.

58. The computer program product of claim 56, wherein the preselected communication is at least one of a voice over Internet Protocol (VoIP) call, an instant message flow, a push-to-talk flow, a streaming video flow, a streaming audio flow, a video telephony flow, or a conversational media control signal flow.

59. The computer program product of claim 56, wherein:
the preselected communication is a voice over Internet Protocol (VoIP) call; and
the non-transitory computer-readable storage medium further comprises instructions for causing the computer to:
generate a traffic flow template for the requested preselected communication with a first configuration, and
modify, in response to the RESV request message, the traffic flow template to have a second configuration for the VoIP call.

60. The computer program product of claim 59, wherein the non-transitory computer-readable storage medium further comprises instructions for causing the computer to:
receive a second RESV request message indicating the IP address of the access terminal; and
restore the traffic flow template to have the first configuration.

* * * * *